United States Patent
Agashe

(10) Patent No.: US 7,600,147 B2
(45) Date of Patent: Oct. 6, 2009

(54) APPARATUS AND METHOD FOR MANAGING TRAPS IN A NETWORK ENVIRONMENT

(75) Inventor: Umesh Agashe, Ronkonkoma, NY (US)

(73) Assignee: Computer Associates Think, Inc., Islandia, NY (US)

(*) Notice: Subject to any disclaimer, the term of this patent is extended or adjusted under 35 U.S.C. 154(b) by 838 days.

(21) Appl. No.: 10/887,532

(22) Filed: Jul. 8, 2004

(65) Prior Publication Data

US 2005/0039188 A1 Feb. 17, 2005

Related U.S. Application Data

(60) Provisional application No. 60/486,677, filed on Jul. 11, 2003.

(51) Int. Cl.
*G06F 11/00* (2006.01)
(52) U.S. Cl. .......................................... 714/4; 709/223
(58) Field of Classification Search .................. 714/48, 714/4, 57; 709/223, 224
See application file for complete search history.

(56) References Cited

U.S. PATENT DOCUMENTS

| | | | | | |
|---|---|---|---|---|---|
| 5,561,769 | A | * | 10/1996 | Kumar et al. | 709/202 |
| 5,630,123 | A | * | 5/1997 | Hogge | 707/7 |
| 5,828,830 | A | * | 10/1998 | Rangaraian et al. | 714/48 |
| 6,058,420 | A | * | 5/2000 | Davies | 709/224 |
| 6,167,403 | A | * | 12/2000 | Whitmire et al. | 707/10 |
| 6,253,243 | B1 | * | 6/2001 | Spencer | 709/224 |

OTHER PUBLICATIONS

Nov. 18, 2004 International Search Report in connection with International Application No. PCT/US2004/021815 which corresponds to the above-identified application.

\* cited by examiner

*Primary Examiner*—Dieu-Minh Le
(74) *Attorney, Agent, or Firm*—Baker Botts L.L.P.

(57) ABSTRACT

An apparatus for managing traps in a network environment is provided. The apparatus includes a trap manager and a trap daemon. The trap manager includes an interface for managing trap filters in a network management application. The trap daemon monitors for traps received by the network management application and applies the trap filters to the traps.

20 Claims, 4 Drawing Sheets

APPARATUS AND METHOD FOR MANAGING TRAPS IN A NETWORK ENVIRONMENT

CROSS-REFERENCE TO RELATED APPLICATION

This application claims the benefit of commonly owned U.S. Provisional Application No. 60/486,677, filed Jul. 11, 2003 and entitled "MANAGING TRAPS IN A NETWORK ENVIRONMENT".

TECHNICAL FIELD

This disclosure relates to network management. In particular, the disclosure relates to managing traps in a network environment.

DESCRIPTION OF RELATED ART

In the current information age, a computer network may include hundreds, if not more, of devices (for example, servers, routers, nodes, software applications, etc.). In most instances, a computer network is managed by one or more network management application software.

For example, network management applications may comply with the Simple Network Management Protocol (SNMP). SNMP is a protocol directed to network management and monitoring network devices and their functions. A MIB (Management Information Base) database stores descriptions of objects and features in a network which may be accessed using SNMP. Each manageable device on the network can include, for example, a SNMP agent which resides on the device and performs management functions. The SNMP agent has an associated MIB module which describes all of the manageable features of the device regarding which the agent knows. The collection of MIB modules of devices in the network is often referred to as "MIBs".

A trap is a message sent from an agent to a network management application to alert the application to a problem or a significant event. Definitions of traps which may be transmitted by an agent are stored in the MIB module associated with the agent. The traps which may be transmitted by an agent typically are defined by the creator, vendor or manufacturer of the associated device.

In complex networks with hundreds of devices from different vendors, a management application may receive thousands of different traps. A user may not be interested in many of them, and often prefers not to be alerted to traps (for example, through an event management console) regarding which the user has no interest. In some instances, a user may install filters to screen out traps regarding which the user has no interest. Manually adding filters for these traps, however, can be time-consuming and difficult.

SUMMARY

The application provides an apparatus for managing traps in a network environment. In one embodiment, the apparatus includes a trap manager and a trap daemon. The trap manager includes an interface for managing trap filters in a network management application. The trap daemon monitors for traps received by the network management application and applies the trap filters to the traps.

The application also provides a method for managing traps in a network environment. In one embodiment, the method includes providing a trap manager for managing trap filters in a network management application, and monitoring for traps received by the network management application and applying the trap filters to the traps.

BRIEF DESCRIPTION OF THE DRAWINGS

The features of the present application can be more readily understood from the following detailed description with reference to the accompanying drawings wherein.

DETAILED DESCRIPTION

This application provides tools (in the form of methods, apparatus and systems) for managing traps in a network environment. The tools may be embodied in a computer program stored on a computer readable medium and/or transmitted via a computer network or other transmission medium.

An apparatus 10 for managing traps in a network environment, according to one embodiment (FIG. 1), comprises a trap manager 11 and a trap daemon 12. The trap manager 11 includes an interface for managing trap filters in a network management application.

The interface may include a trap editor for adding a trap filter to the network management application and/or removing one or more of the trap filters. The interface may include means for comparing a new trap filter to the trap filters in the network management application, and if the trap filters includes a super-filter under which the new trap filter is subsumed, not adding the new trap filter to the network management application. The interface may include means for comparing a new trap filter to the trap filters in the network management application, and if the trap filters includes sub-filters which are subsumed by the new trap filter, adding the new trap filter and removing the sub-filters.

The trap manager may further include a second interface for configuring the trap daemon. The apparatus may further comprise means for displaying a status of the trap daemon.

Figure 1:
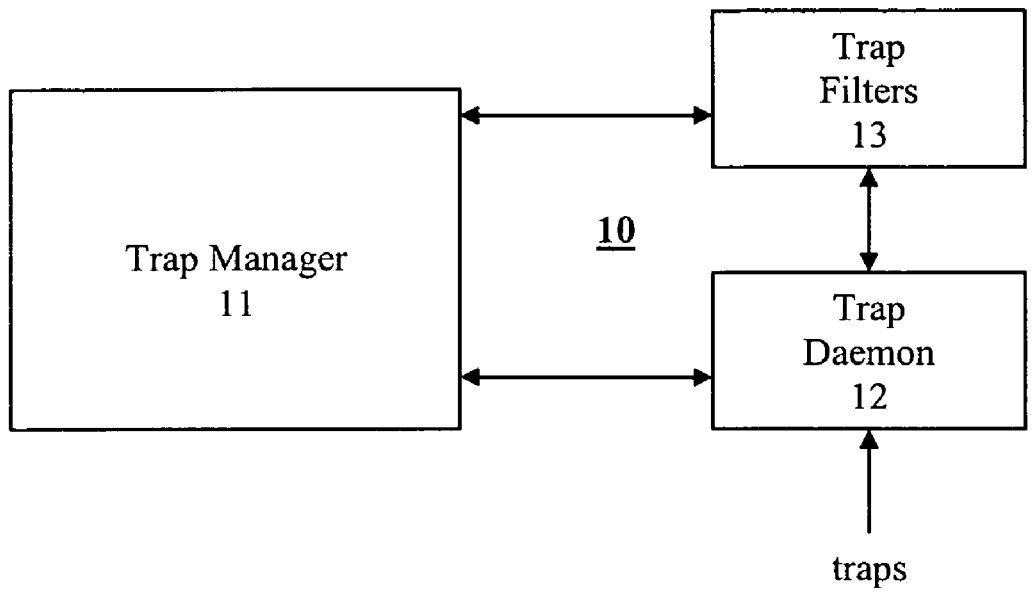
FIG. 1 shows a block diagram of an apparatus for managing traps in a network environment, according to one embodiment.
Figure 2:
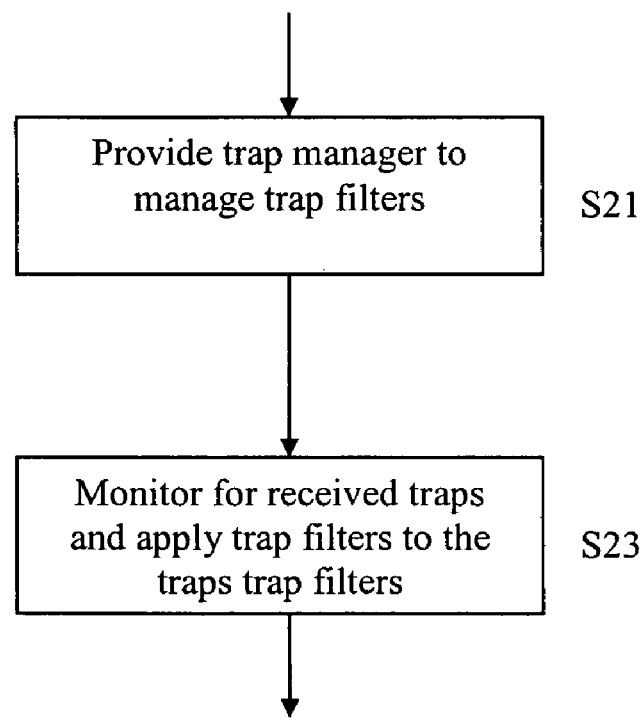
FIG. 2 shows a flow chart of a method, according to one embodiment, for managing traps in a network environment.

A method for managing traps in a network environment, according to one embodiment, will be described with reference to FIGS. 1 and 2. The trap manager 11 is provided and used to manage trap filters in a network management application (step S21). The trap daemon 12 monitors for traps received by the network management application and applies the trap filters to the traps (step S22).

The method may further include providing a trap editor for adding a trap filter to the network management application and/or removing one or more of the trap filters.

The method may further include comparing a new trap filter to the trap filters in the network management application, and if the trap filters includes a super-filter under which the new trap filter is subsumed, not adding the new trap filter to the network management application.

The method may further include comparing a new trap filter to the trap filters in the network management application, and if the trap filters includes sub-filters which are subsumed by the new trap filter, adding the new trap filter and removing the sub-filters.

The method may further include providing a configuration interface for configuring the trap daemon, and/or displaying a status of the trap daemon.

Figure 3:
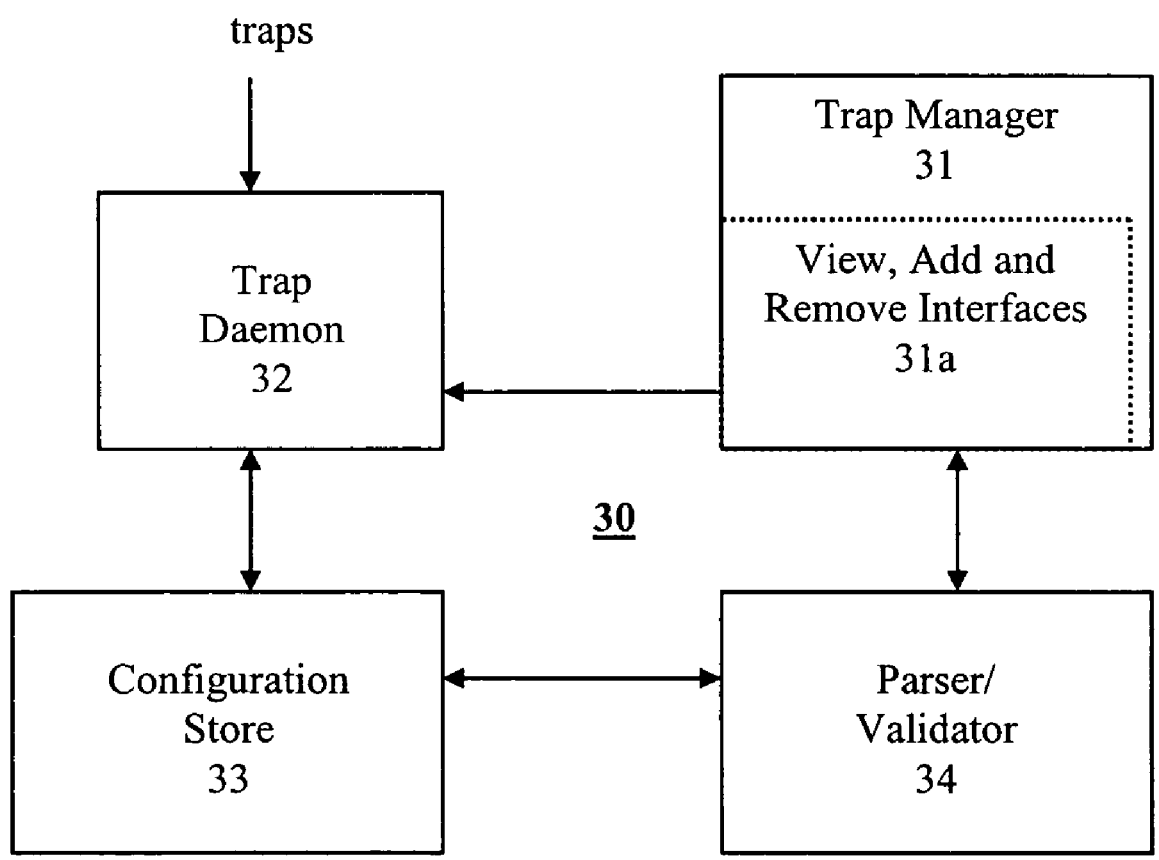
FIG. 3 shows a block diagram of an apparatus, according to another embodiment, for managing traps in a network environment.

The high-level structure of an apparatus 30 for managing traps in a network environment, according to another embodiment, is illustrated in FIG. 3. The apparatus 30 includes a trap manager 31, which has view, add and remove filter interfaces 31a, a trap daemon 32, a configuration store 33 and a parser/validator 34.

The trap manager 31 can be an application or utility which provides functionality for management of trap filtering. For example, a user interface may be provided to help a user to filter out traps from, for example, appearing on an event management (EM) console. A user can filter out the traps he or she is not interested in by specifying appropriate filters which may be added to the trap filter configuration file 33. The user can filter out, for example, individual traps by specifying trap level filters to be added, or traps for a particular vendor or a MIB by adding vendor level or MIB level filters, respectively.

For example, a filter may be specified in the following format:

host:community:generic:specific:OID:action #comments

The user may be provided with the flexibility of manually specifying values or masks for filter fields, such as machine name or IP address, SNMP community string, OID, generic ID, specific ID, etc. The trap manager can allow use of wildcards or regular expressions for specifying filters. The user can add filters by specifying an exact value or a wildcard for a node name or an IP address, generic ID, specific ID and community string. For a vendor or MIB node, a filter can be added for user-specified OIDs (MIB object identifiers) with a generic ID and a specific ID, each of which maybe indicated by '*' (i.e., a mask that matches all values of the field) or a range of values. For a trap, exact values are specified for a generic ID and a specific ID.

The trap manager user interface preferably allows the user to easily configure trap filters. For example, a user friendly GUI (graphical user interface) may be provided for adding trap filters to or deleting trap filters from the trap filter file. The user interface can allow the user to see the vendors, MIBs and traps for which filters exist. The user can select or deselect OIDs to be included or excluded. When the user selects a node (for example, vendor/MIB/trap), a list of OIDs can be displayed to the user. The user can select or deselect the OIDs to include and specify values for the rest of the fields, and then a corresponding filter may be added to the filter file. Thus, the user can easily filter out hundreds of traps for a specific vendor or MIB through, for example, a click of a button.

Figure 4A:
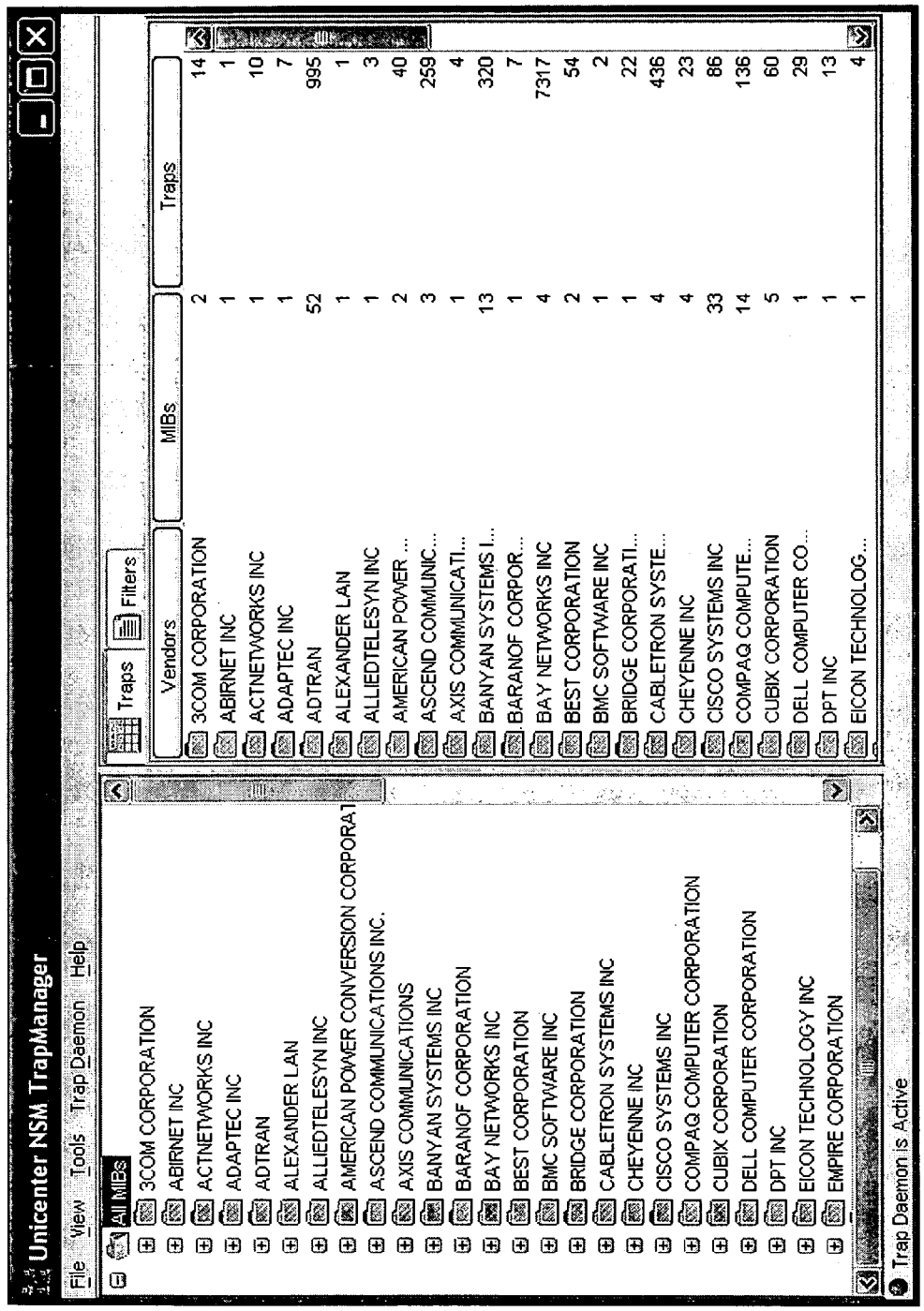
FIGS. 4A and 4B show snapshots of user interface windows for trap filter configuration.
Figure 4B:
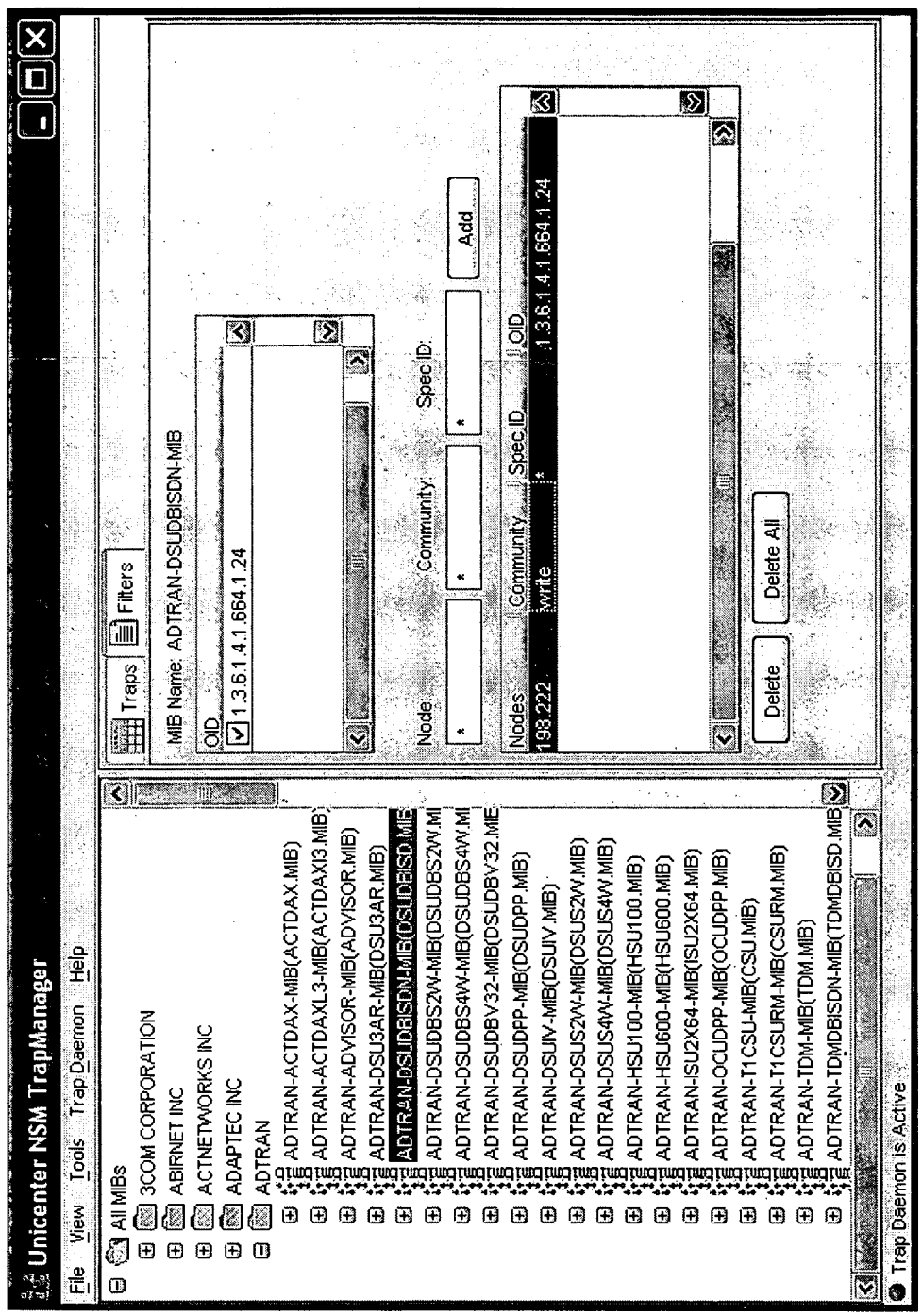

Some exemplary user interface windows are shown in FIGS. 4A and 4B. For each node in the trap editor tree (shown in the left pane) there are two tabbed panes on the right side. One tabbed pane displays node details and the other displays node specific filter. A user can specify a filter for any node in the trap editor tree by selecting the 'Filter' tab on the right pane for that node. The user can be provided with a filter form, such as shown exemplarily in FIG. 4B.

The user can specify the node name and community string to set a filter for a particular node. For every node-community pair specified by the user an entry is made in a configuration file. For vendor nodes, an entry is added for the OIDs under that vendor with generic and specific fields set to '*'. For MIB nodes, an entry is added with OID and generic ID values set to actual values and specific ID is set to '*'. For trap nodes, generic, specific ID and OID fields have respective values set.

For example, if a user selects vendor node '3COM CORPORATION' and sets the filter for nodes with community set to 'public', the following line is added in the configuration file:

*:public:*:*:1.3.6.1.4.1.43 ignore

For vendor 'ASCEND COMMUNICATIONS INC', the following 2 lines are added because it has two OIDs:

*:public:*:*:1.3.6.1.4.1.529 ignore
*:public:*:*:1.3.6.1.4.1.562.3.3.5 ignore

Filter entry for MIB node 'ADAPTEC-MIB' with node=198.222 appears as follows:

198.222:*:6:*:1.3.6.1.4.1.795.2.6.1 ignore

The filter "198.222:*:6:*:1.3.6.1.4.1.795.2.6.1 ignore" causes the trap daemon to ignore traps with OID=1.3.6.1.4.1.795.2.6.1 and generic id=6 from all the machines on 198.222 subnet. On the other hand the filter "*:public:6:*:1.3.6.1.4.1.795.2.6.1 ignore" causes the trap daemon to ignore traps with mentioned OID and generic id from all the machines on the network if community string is public.

A trap filter may appear as follows:

198.222:private:6:2:1.3.6.1.4.1.9.10.17.3 ignore

The host can be an IP address such as 111.222.333.4, a subnet address such as 111.222, a node name such as labmc1, a name mask such as lab* or simply '*'.

The community string can be a value such as public, a mask such as pub*, or simply '*'.

The OID can be an object identifier such as 1.3.6.1.4.1.791.4, a mask such as 1.3.6.1.4.1.*, or simply '*'.

The generic ID can be a number or simply '*'.

The specific ID can be any number or a range, or simply '*'.

The action can be 'ignore'.

A user can specify overlapping filters, such as the following:

111.222:*:*:*:1.3.6.1.4.1.791.4 ignore
111.222:pub*:6:1:1.3.6.1.4.1.791.4 ignore The trap manager checks for overlapping filters. Before a specified filter is added, an existence of a super-filter (for example, a filter that subsumes the specified filter and matches a super-set of traps matched by the specified filter) and a sub-filter (for example, a filter that is subsumed by the specified filter and matches a subset of traps matched by the specified filter) is checked. The specified filter is not added if a super-filter which subsumes the specified filter already exists. The specified filter is added if a super-filter does not exist. On the other hand, sub-filters which are subsumed by the specified filter are deleted if the user chooses to do so.

A user can directly modify the configuration file to specify filters which can result in overlapping filters. For example, a user may add a specific filter and then add a generic filter which overlaps with the specific filter:

198.222:private:6:2:1.3.6.1.4.1.9.10.17.3 ignore
198.222:*:*:*:1.3.6.1.4.1.9.10.17.3 ignore or

*:*:*:*:1.3.6.1.4.1.529 ignore
198.222:pub*:*:*:1.3.6.1.4.1.529 ignore

The trap manager checks for such overlapping filters before adding it in the trap filter configuration file. An appropriate error or confirmation message may be displayed to the user. If the user uses the trap editor GUI for specifying a new filter, file consistency is maintained automatically. However, the user can edit the configuration file manually.

The configuration file 33 may be used to store the specifications of the trap filters. The trap manager may present the filters in this file to the user and update this file as the user adds or removes filters.

The trap daemon 32 reads information from the trap filter configuration file 33 and filters out traps as per rules specified in the configuration file. The trap manager 31 parses the configuration file 33 through parser 34 and presents the filters to the user through the trap manager GUI. The user can view, add or remove filters through the interface 31a. User changes to trap filters are inserted in the configuration file for the trap daemon to use. Configuration file consistency is maintained by the trap manager.

The trap filter configuration file contains masks of enterprise OIDs to be excluded by the trap daemon. Traps received by the trap daemon that match any 'host:community:generic: specific: OID' string with action 'ignore' in the trap filter file, are not reported to the event management console.

Trap Daemon Control and Monitoring

A trap manager may include functionality for configuring, control and monitoring of the trap daemon.

The trap manager can configure the trap daemon, and may maintain a trap translation database to which the trap daemon refers. The trap daemon also reads the trap filter configuration file. The trap information stored in the trap translation database and in the trap filter configuration file may be presented to the user in a hierarchical format (for example, Vendor-> MIBs->Traps). As discussed above, the trap manager can provide an interface to help the user to easily browse, add, modify and delete trap translation messages and trap filters. The user can import trap definitions in the MIB file by using the trap manager interface.

The trap daemon receives traps and if they match any of the filter criteria specified in the trap filter file, the trap daemon does not report them to the EM console. Traps not matching any of the filters are translated to meaningful, easy-to-understand messages and displayed on the EM console.

The trap manager may also display a status of the trap daemon. Since a trap manager works very closely with a trap daemon, the trap manager may provide an interface for a user to monitor the status of the trap daemon, start and stop the trap daemon if necessary, and report a modification to the trap database to the trap daemon without stopping it. The user also can be provided with options to request the trap daemon to reload trap information.

The above specific embodiments are illustrative, and many variations can be introduced on these embodiments without departing from the spirit of this disclosure or from the scope of the appended claims.

For example, although the trap filters in some of the embodiments described above are specified in a configuration file, it should be understood that this disclosure and the appended claims are not limited to specification of trap filters through a file. It should also be apparent that the trap filters can, for example, be stored in and retrieved from a database. In addition, the trap filters can be stored in any of assorted media and/or stored remotely and retrieved as needed.

Elements and/or features of different illustrative embodiments may be combined with each other and/or substituted for each other within the spirit of the disclosure and the scope of the appended claims.

Additional variations may be apparent to one of ordinary skill in the art from reading U.S. Provisional Application No. 60/486,677, filed Jul. 11, 2003, which is incorporated herein in its entirety by reference.

What is claimed is:

1. A method for managing traps in a network environment, comprising:
   receiving a command to add a new, not already existing trap filter to a network management application;
   comparing the command to a plurality of existing trap filters in the network management application; and
   determining whether to add the new, not already existing trap filter, based on the comparison.

2. The method of claim 1, further comprising adding the new, not already existing trap filter to the network management application.

3. The method of claim 1, wherein determining whether to add the new trap filter comprises:
   determining that the new, not already existing trap filter would subsume a particular one of the existing trap filters;
   adding the new, not already existing trap filter to the network management application; and
   removing the particular one of the existing trap filters subsumed by the new, not already existing trap filter.

4. The method of claim 1, wherein determining whether to add the new, not already existing trap filter comprises:
   determining that the new, not already existing trap filter would be subsumed by an existing trap filter; and
   disregarding the command to create the new, not already existing trap filter.

5. The method of claim 4, further comprising:
   receiving, from a user, an override command to add the new, not already existing trap filter; and
   in response to receiving the command from the user, adding the new, not already existing trap filter to the network management application.

6. The method of claim 1, further comprising:
   displaying a trap editor tree and a tabbed pane display, the tabbed pane display comprising a first tab for displaying information regarding a plurality of network nodes and a second tab for displaying information regarding one or more node-specific trap filters.

7. The method of claim 1, wherein determining whether to add the new, not already existing trap filter comprises determining whether the new, not already existing trap filter would be subsumed by one of the existing trap filters.

8. The method of claim 7, further comprising adding the new, not already existing trap filter to the network management application if the new, not already existing trap filter would not be subsumed by the one of the existing trap filters.

9. The method of claim 7, further comprising disregarding the command to add the new, not already existing trap filter if the new, not already existing trap filter would be subsumed by the one of the existing trap filters.

10. The method of claim 1, wherein determining whether to add the new, not already existing trap filter comprises determining whether the new, not already existing trap filter would subsume one of the existing trap filters.

11. The method of claim 10, further comprising adding the new, not already existing trap filter to the network management application if the new, not already existing trap filter would subsume one of the existing trap filters.

12. The method of claim 10, further comprising deleting the one of the existing trap filters that would be subsumed by the new, not already existing trap filter.

13. An apparatus for managing traps in a network environment, comprising:
   a processor;
   an interface operable to receive a command to add a new, not already existing trap filter to a network management application; and
   a trap manager operable to compare the command to a plurality of existing trap filters in the network management application and determine whether to add the new, not already existing trap filter, based on the comparison.

14. The apparatus of claim 13, wherein the trap manager is further operable to add the new, not already existing trap filter to the network management application.

15. The apparatus of claim 13, wherein determining whether to add the new, not already existing trap filter comprises:
   determining that the new, not already existing trap filter would subsume a particular one of the existing trap filters;
   adding the new, not already existing trap filter to the network management application; and
   removing the particular one of the existing trap filters subsumed by the new, not already existing trap filter.

16. The apparatus of claim 13, wherein determining whether to add the new trap filter comprises:
   determining that the new, not already existing trap filter would be subsumed by an existing trap filter; and
   disregarding the command to create the new, not already existing trap filter.

17. The apparatus of claim 16, wherein the trap manager is further operable to receive, from a user, an override command to add the new, not already existing trap filter and, in response to receiving the override command, add the new, not already existing trap filter to the network management application.

18. The apparatus of claim 13 wherein the interface is further operable to display a trap editor tree and a tabbed pane display, the tabbed pane display comprising a first tab for displaying information regarding a plurality of network nodes and a second tab for displaying information regarding one or more node-specific trap filters.

19. The apparatus of claim 13, wherein determining whether to add the new, not already existing trap filter comprises:
   determining whether the new, not already existing trap filter would be subsumed by one of the existing trap filters;
   adding the new, not already existing trap filter to the network management application if the new trap filter would not be subsumed by the one of the existing trap filters; and
   disregarding the command to add the new, not already existing trap filter if the new trap filter would be subsumed by the one of the existing trap filters.

20. The apparatus of claim 13, wherein determining whether to add the new trap filter comprises:
   determining whether the new, not already existing trap filter would subsume one of the existing trap filters;
   adding the new, not already existing trap filter to the network management application if the new trap filter would subsume one of the existing trap filters; and
   deleting the one of the existing trap filters that would be subsumed by the new, not already existing trap filter.

\* \* \* \* \*